United States Patent [19]

Brokhage

[11] 4,322,295
[45] Mar. 30, 1982

[54] FLUID FILTRATION APPARATUS

[75] Inventor: Josef Brokhage, Leverkusen, Fed. Rep. of Germany

[73] Assignee: Schenk-Filterbau Gesellschaft mit beschränkter Haftung, Waldstetten, Fed. Rep. of Germany

[21] Appl. No.: 84,419

[22] Filed: Oct. 12, 1979

[30] Foreign Application Priority Data

Oct. 17, 1978 [DE] Fed. Rep. of Germany ....... 2845108

[51] Int. Cl.³ .............................................. B01D 33/26
[52] U.S. Cl. ................................ 210/331; 210/333.01; 210/344
[58] Field of Search ............... 210/344, 345, 347, 450, 210/331, 332, 333.01

[56] References Cited

U.S. PATENT DOCUMENTS

| 2,542,527 | 4/1952 | Armstrong | 210/347 |
| 3,608,731 | 9/1971 | Seggebruch | 210/331 |
| 4,104,169 | 8/1978 | Muller et al. | 210/331 |
| 4,172,795 | 10/1979 | Kurtz et al. | 210/347 X |

FOREIGN PATENT DOCUMENTS

| 360975 | 5/1962 | Switzerland | 210/331 |
| 582534 | 12/1976 | Switzerland | 210/331 |

Primary Examiner—Frank A. Spear, Jr.
Attorney, Agent, or Firm—Becker & Becker, Inc.

[57] ABSTRACT

A fluid filtration apparatus including a filter packet enclosed by a container and comprised of a filtering element arranged on a hollow shaft through which filtrate is removed. The filtration apparatus also includes a seal arrangement to prevent filtrate from reentering into the space containing the fluid to be filtered. The seal and/or the part including the seal surface can be moved to form a gap to prevent damage of the seal during cleaning of the filtering elements.

4 Claims, 3 Drawing Figures

FLUID FILTRATION APPARATUS

The present invention relates to a fluid filtration apparatus including an enclosed filter packet comprising filtering elements arranged on a hollow shaft. The filtration apparatus also includes a seal at the interface between the space containing the fluid to be filtered and the space for the filtrate.

BACKGROUND OF THE INVENTION

A first seal is arranged on a shaft in a known filtration apparatus of this type through which the filtrate is drained. The seal extends over the full radial distance between this shaft and the oppositely arranged inner wall of the housing which encloses the shaft. Thus, the seal rotates when the hollow shaft rotates so that the seal rubs on the fixed container wall. Accordingly, after only a relatively short period of use, the seal becomes worn to such an extent that it has to be replaced by a new seal. However, this entails a substantial amount of assembly effort.

It is accordingly an object of the invention to provide a filtration apparatus which avoids wear of the first seal due to forces acting on the hollow shaft.

This object and other objects and advantages of the invention will appear more clearly from the following specification in connection with the accompanying drawings, in which.

SUMMARY OF THE INVENTION

Figure 1:
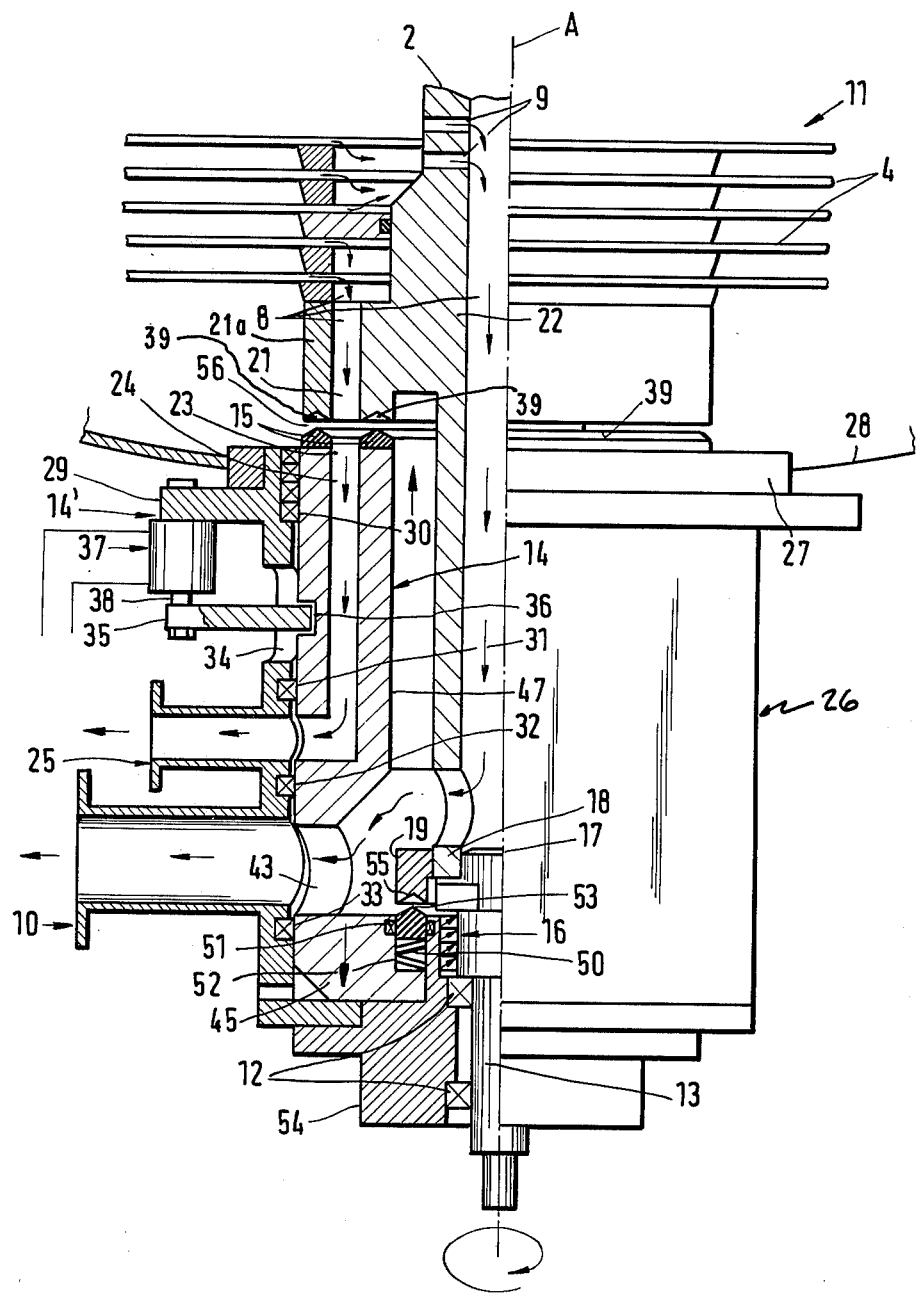
FIG. 1 is a partially sectioned side elevational view between the filtering elements and the associated drive of a filtration apparatus in accordance with one embodiment of the present invention.

The present invention is characterized primarily therein that the first seal or seal member, and/or the pertaining seal surface can be moved into a non-sealing position. In accordance with the present invention, the first seal is adapted to be moved into its sealing position when the shaft is not moved, for example, during main and residual volume filtration. On the other hand, for example, for cleaning of the filtering elements, for which the shaft is moved, the seal can be moved to be non-sealing position or out of contact with its associated seal surface. Thus, no relative movement occurs between the seal and the seal surface so that the seal is generally not subjected to wear and, thus, has a substantial serviceable life. The high serviceable life, however, means that a higher filtration performance is attained because the shut-down periods for replacing used or damaged seals are substantially shorter in duration. Furthermore, because of the non-sealing or contact-free position of the seal in relation to the shaft, also the filter packet can be substantially more quickly and more easily disassembled because care need not be taken, in order to avoid damaging the seal by which the shaft is sealed. Accordingly, since a view during assembly of such an arrangement need not be required, the filter packet can be held ready as a unit at the location where required which substantially reduces the assembly effort.

In accordance with another embodiment of the invention, the first seal is arranged so as not to interfere with the path or movement of the shaft during its assembly and disassembly.

In accordance with another preferred embodiment, the first seal and/or the associated seal surface are axially movable by at least one adjusting or actuating device.

In accordance with another embodiment of the invention, the first seal extends substantially perpendicular to the longitudinal central axis of the hollow shaft, preferably between a widened portion thereof and the housing which surrounds the shaft in the region below the container or housing means for the filter packet. The first seal bounds or defines a collecting channel for the final filtrate; this collecting channel is preferably formed by two axially adjacent seal rings; these seal rings are also concentric relative to the hollow shaft, and the channel is formed also by at least one passage in the widened portion of the hollow shaft. The collecting channel is in communication with at least one final filtrate passage in the housing.

In the sealing position of the first seal there is located between the shaft and the cover which closes the bottom of the housing for the drive shaft and part of the hollow shaft, at least one resilient support arrangement, preferably a resilient and sealing second seal and support arrangement. The second seal extends approximately at the level of the plug-in connection arrangement between the hollow shaft and the drive shaft; this drive shaft is connectible by a transmission to the drive of the filtration apparatus belonging therewith. The second seal includes at least one spring and a seal member of the type used for the first seal. In accordance with another preferred embodiment of the invention, the hollow shaft can be moved by means of the adjusting or actuating device preferably in the form of an actuating system such as, for example, a pneumatic-hydraulic piston-cylinder unit, a mechanical screw spindle, and the like; this actuating system is operatively connected to the upper end of the hollow shaft for moving it downwardly to effect the sealing position. The hollow shaft is preferably adapted to assume its sealing position in opposition to a resetting force, preferably exerted by the force of a disc spring packet. This disc spring packet is preferably arranged in an aperture at the lower end of the hollow shaft whereby this aperture is adapted to receive the free end of the drive shaft.

The housing for the drive shaft and part of the hollow shaft preferably comprises two parts whereby the first seal is operatively connectible to the inner housing part which is movably arranged in the outer housing part, whereby movement can be effected by the adjusting device. The inner housing part is connectible to the adjusting device by means of a generally horizontally extending arm, whereby the arm extends through an opening in the outer housing part. The inner housing part is provided with a passage for the residual or final filtrate and with an outlet opening for the main filtrate, and both communicate, when the seal is in sealing position, with a final filtrate outlet and a main filtrate outlet, respectively.

DETAILED DESCRIPTION

Figure 2:
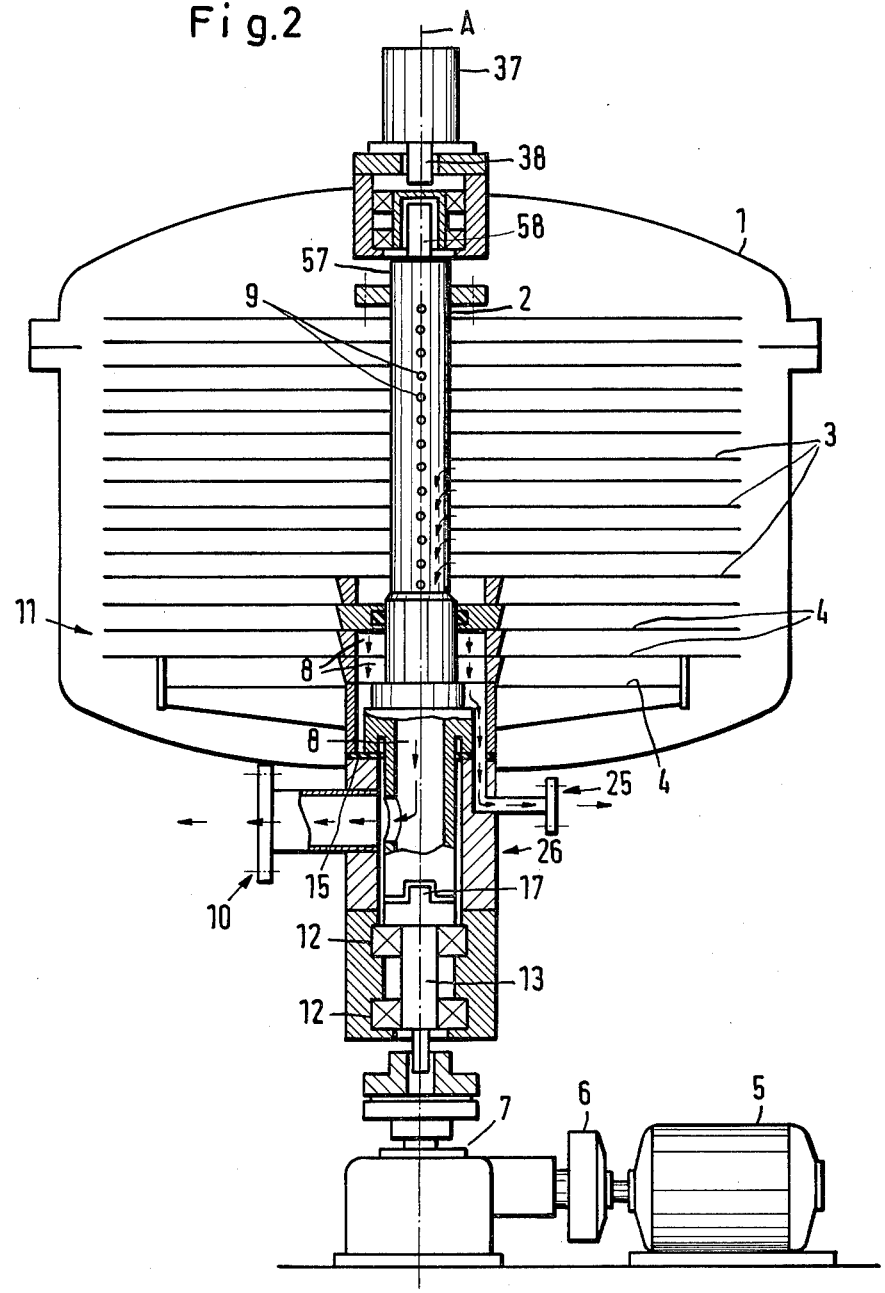
FIG. 2 is a partially sectioned diagrammatic side elevational view of a further embodiment of a filtration apparatus in accordance with the present invention.

Referring now particularly to the drawings, as indicated in FIG. 2, the filtration apparatus in accordance with the embodiment shown therein comprises generally a container or pressure container or housing means 1, and a filter packet arranged in the housing means. This packet comprises main filtering elements 3 and final filtrate elements 4 arranged on a hollow shaft 2. This shaft 2 is also at times referred to as a filtrate draining shaft. The filtering elements 3 and 4 extend substantially perpendicular to the longitudinal axis A of the hollow shaft 2. There is further provided a drive including a motor 5, a hydrodynamic clutch 6 and a transmission 7 for driving the drive shaft 13.

For filtration, liquid to be filtered is fed into the container 1 through an inlet, not shown. Simultaneously, any air is removed from container 1. Due to the pressure exerted by the pump, further liquid or fluid to be filtered is delivered to the container 1. Because of the difference in pressure between the inlet and the outlet, impurities and solids are retained on the filtering elements 3 and 4, or on filtering aids arranged thereupon, while the resulting filtrate drains through the hollow shaft 2 and through a main filtrate exit or outlet 10 from the container 1 (compare FIGS. 1 and 3). In order to avoid that solids are passed from space 11 containing the fluid to be filtered into the space containing the filtrate, this space being designated by number 8, a first seal or seal member 15 is provided between the hollow shaft 2 and an axially adjacent housing 26 which forms a base.

In the vicinity of the drive shaft 13, there is provided a journal or bearing seal 16 immediately above the journal or bearing 12, which seal 16 serves to seal the bearing 12 against moisture.

Above this seal 16, approximately at the level of the exit or outlet 10, the hollow shaft 2 and the drive shaft 13 are connected to one another by a plug-in connection whereby the upper end 17 of the drive shaft 13 extends into the end 18, this end providing one half of the plug-in connection.

When the throughput or capacity going through the filtering elements 3 and 4 is markedly reduced, due to accumulation of solids in the form of a filter cake, filtration is terminated and the filtering elements have to be cleaned to remove the filter cake. for this purpose, the hollow shaft 2 is rotated by means of the drive elements 5–7, with the filter cake being radially spun off into the lowermost portion of the container 1. From here, the filter cake is then removed from the container 1 through an outlet, not shown. Subsequent to removal of the filter cake, the container 1 is supplied again with fluid to be filtered for a further filtration.

In order to achieve a more thorough cleaning of the filtering elements, especially filtering elements made of cloth, it may be necessary to utilize a backwashing, so that a rinsing fluid is passed through the filter packet in the direction opposite to the direction of flow of the filtrate.

Figure 3:
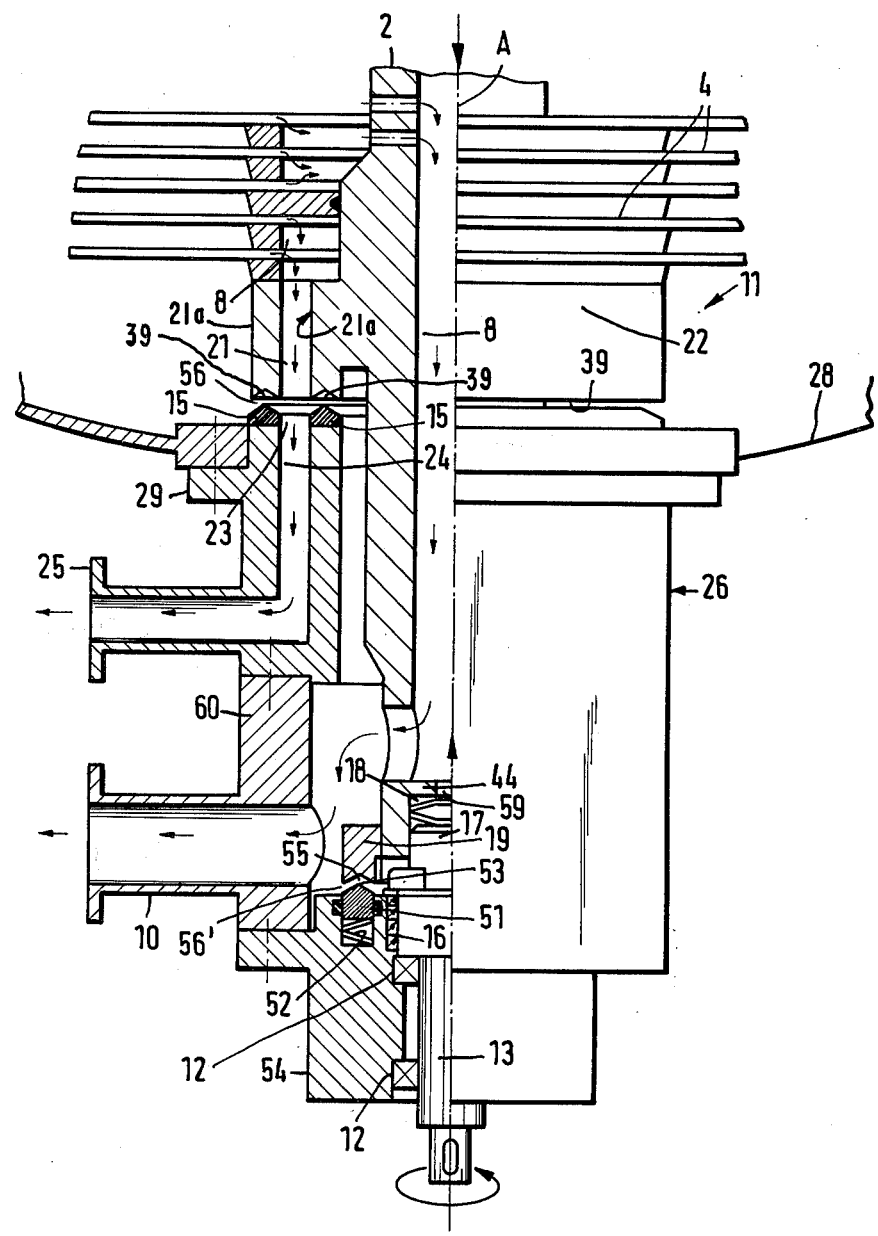
FIG. 3 is a view similar to FIG. 1 of the corresponding portion of the filtration apparatus in accordance with FIG. 2.

In the filtration apparatus indicated in FIGS. 1–3, there are also provisions made for a final or residual volume filtration. Generally, bores 9 of the main filtering elements 3 are connected by way of the hollow shaft with the exit, first drain or outlet 10. The pertaining outlets of the final filtering elements 4, however, are in communication with pertaining bores or an annular space 21 in a radially widened portion or shoulders 22 of the hollow shaft 2. These bores 21, defined by annular members 21a, in turn, are in communication with an annular collectin channel 23 provided by seal member 15 in the housing parts 14 and 14' (FIG. 1). The final or residual filtrate flows then through at least one L-shaped passage 24 of the housing to leave the apparatus through outlet or second drain 25.

For a filtration apparatus in accordance with FIG. 1, the housing 26 comprises housing parts 14 and 14'; the housing part 14 is an inner annular or ring-like housing part which can be moved in relation to the outer annular or ring-like housing part 14' by means of an adjusting or actuating device 37, preferably including three hydraulic piston-cylinder units whereby the upper end faces of these housing parts extend at the same level as the container bottom 28. The outer housing part 14' in a location radially outwardly of the widened portion or shoulder 22 is secured to an annular flange 27 of the container bottom 28 by means of a flange 29 of housing part 14'. Securing or fastening can be effected by screws or similar fasteners. In order to positively seal the inner housing part 14 against the housing part 14', there are provided several seals 30–33, arranged axially one above the other, of which, for example, four seals 30 are arranged in the vicinity below the container bottom 28 while seals 31, 32 and 33 are axially adjacent to one another at the residual or final filtrate outlet 25 and the main filtrate exit 10. The outlet 25 and the exit or outlet 10 are extended through the outer housing part 14'.

Several window-like openings 34, distributed about the circumference of the outer housing part 14' are arranged in the outer housing part 14' between the flange 29 and the outlet 25 so that an arm 35 can reach into an aperture 36 in the inner housing part 14. The openings 34 are dimensioned in such a way that the arm or arms 35, upon moving of the inner housing part 14 by means of the piston 38 belonging therewith, can carry out the required travel. The flange 29 serves to mount the actuating devices 37 with the piston rods 38 thereof being operatively connected to the arms 35. In addition to the outlet or passage 24, the inner housing part 14 is provided with a passage 43 which is in communication with the main filtrate exit 10 to remove filtrate from the system.

At the end face 39 of inner housing part 14 as arranged within the the container 1, there is provided the first seal or seal member 15. The seal 15 is formed by two rings or seal rings which are coaxial relative to the longitudinal central axis A of the filtrate drain shaft 2. The seal rings are preferably arranged at the end face of the inner housing part 14.

The first seal 15, on the one hand, forms the collecting channel 23 for the filtrate obtained during final or residual filtration and has as its main purpose during main filtration to seal the space 11 receiving the liquid to be filtered from the space 8 receiving the filtrate. These rings or seal 15 have generally the same cross section which includes an upwardly directed apex to provide a large contact surface area. At the end face of the shoulder 22 of shaft 2, there are arranged downwardly facing, a seal surface-forming depressions 39 which correspond in outline to the shape of the rings of the seal 15.

There is to be understood that the seal can be provided by way of other seal shapes. For example, the seal components can be arranged at the shaft shoulder and the seal surfaces can be arranged at the housing parts, an attachment part, and the like.

In order to prevent liquid from reaching the bearing 12, a second seal 51 is arranged in an annular shoulder 50 of the end portion 45 of the housing part 14. This as also in the form of a ring. This second seal 51 is, for example, resiliently supported by means of a disc spring packet 52. The seal 51 is generally of the same cross section as the first seal 15. In its sealing position, a free end 53 thereof engages the axially adjacent collar 29 which has a correspondingly shaped seal or seal surface 55. The collar 29 is secured to the lowermost end of shaft 2.

In its lowered position, the inner housing part 14 is fully supported on a bottom surface (FIG. 1) delineated by the housing part 14' and cover 54. Hereby, the first seal 15 and the second seal 51, respectively are at a distance from the seal surfaces 39 and 55 belonging therewith so that gaps 56 and 56', respectively, are formed which prevent that during rotation of shaft 2 there will be a contact of the seals with the seal surfaces belonging therewith.

In order during backwashing to prevent that the rinsing liquid passes through the gap into the container 1, and thus reduces the rinsing intensity, at the inner wall 47 of the housing part 14 devices can be provided which would control the flow of the backwashing liquid.

In FIGS. 2 and 3 for the corresponding components, the reference numerals of FIG. 1 have been used. In contrast to the apparatus in accordance with FIG. 1, the first seal 15 according to FIGS. 2 and 3 is arranged at the upper end face of housing 26; this housing 26 is fixed in relation to the housing 1. This housing 26 corresponds generally to housing 14 of FIG. 1. The seal surface 39 formed by the end face of the shoulder 22 can be vertically moved by movement of the filtrate drain shaft 2 in order to produce the desired gap 56 when rotating the filter packet for cleaning thereof.

The adjusting device or actuating means 37 in accordance with FIG. 1 is provided by a hydraulic piston-cylinder unit which is attached to the upper end 57 (FIG. 2) of the filtrate drain shaft 2 which in turn is journalled by a bearing 58. The piston rod 38 therewith is aligned with the longitudinal central axis "A" of shaft 2. The adjusting device 37 serves to exert the necessary pressure on the shaft or the seal surfaces 39 and 55 of the shaft 2 to be in contact with the first seal 15 and the second seal 51.

In the end 18 of the filtrate drain shaft 2, between the shoulder 44 in the shaft 2 and the end 17 of drive shaft 13 there is arranged a disc spring packet 59 which is tensioned when the shaft 2 is moved downwardly to maintain the sealing positions of the system. Thus, after retraction of the piston rods 38, i.e. after completed filtration, the shaft 2 can be moved upwardly to its initial position for cleaning of the filtering elements 3 and 4, because the spring disc packet 59 assumes its rest or expanded position. In this initial or starting position, the first seal 15 and the second seal 51 provide a gap or are at a distance from the seal surfaces 39 and 55 belonging therewith, respectively, so that the filtrate drain shaft 2 can be rotated freely relative to the first seal 15 and the second seal 51 for cleaning of the filtering elements 3 and 4.

Also to be understood is that the filtrate drain shaft 2 can be moved upwardly by the hydraulic piston-cylinder unit 37, by a further piston cylinder unit, or by other similar actuating means.

The embodiments according to FIGS. 2 and 3, in contrast to the embodiment according to FIG. 1, have the advantage that no housing part 14 and the seals 30-33 for the respective sealing relative to the housing part 14' are required. Furthermore, housing 26 is constructively simple since no window-like openings are required, the flange 29 need not be too wide, and no arm 35 is required. Furthermore, this embodiment is more compact in structure because of the smaller outer diameter of the outer housing part 14'. The first seal 15, the passage 24, and the resiliently arranged second seal are formed as was the case in FIG. 1 and are arranged in the housing 26. In contrast to the filtration apparatus of FIG. 1, in the embodiment according to FIGS. 2 and 3, the main filtrate exit or outlet 10 is provided at an annular intermediate part 60 threadingly secured to housing 26.

Due to the gaps 56 and 56' in the filtration apparatus described, which gaps are associated with the first seal 15 and the second seal 51, respectively, only the journal seal 16 arranged at the drive shaft 13 is provided between components of the apparatus which rotate relative to one another during rotation of the shaft. In contrast, the first seal 15, the second seal 51, and the seals 30-33 (FIG. 1) located between the inner housing part 14 and the outer housing part 14' are arranged, accordingly, between components of the apparatus which do not move. Thus, these seals can be designated as static seals that are not subjected to any substantial wear. The seal 16, due to the plug-in connection between the filtrate drain shaft 2 and the drive shaft 13 can be replaced readily within a short period of time. Only cover 54 has to be removed and the drive shaft has to be dismantled, or disassembled for this purpose. Furthermore, all seals are arranged so that they are positioned to be away from or outside the path of the filtrate drain shaft 2 during installation in the container 1. Because of this, the filter packet can be installed in a preassembled condition into the container 1 simply and quickly, without the danger arising that the seal will be damaged during assembly and disassembly, and it does not require a definite attitude as to the seals in order not to damage these.

Finally, the filtrate drain shaft 2 and the container 1 are generally of the same configuration as in known filtration apparatus, so that installed filtration apparatus can readily be fitted with these parts.

In filtration apparatus not used for final filtration, the first seal member can be provided by a single seal ring since no collecting channel is required.

The present invention is, of course, in no way restricted to the specific disclosure of the specification and drawings, but also encompasses any modifications within the scope of the appended claims.

What I claim is:

1. A filtration apparatus for separating solid material from a fluid medium, the apparatus comprising in combination:

a housing for receiving the fluid medium to be filtered;

a bearing means at the top wall of the housing and an opening through the bottom of the housing;

a vertically extending hollow shaft journalled in the bearing means for rotation with respect to the housing and passing through the opening in the bottom wall of the housing, said hollow shaft including a plurality of holes therein communicating with the interior of the housing and a drain positioned outside of the housing;

a filter packet, including a plurality of horizontally extending surfaces extending radially beneath the holes of accumulating solid particles precipitating out of the fluid medium as the fluid medium drains through the holes into the hollow shaft;

a residual filtration section adjacent to the lower end of the hollow shaft, the residual filtration section including an annular member positioned in spaced relation to the exterior surface of the hollow shaft and defining an annular space therebetween through which the filtered medium drains;

a base disposed beneath the housing, said base including: bearing means for supporting the hollow shaft for rotation with respect to the base and housing, a bearing seal for protecting the bearing means and preventing drainage over the bearing means, a first drain in the base communicating with the drain in the hollow shaft, a second drain in the base communicating with the annular space;

static sealing means between the base, hollow shaft and annular member, the sealing means comprising:

downwardly facing, fixed, static sealing surfaces on the hollow shaft and annular member and upwardly facing, fixed static sealing surfaces on the base; wherein, when the static sealing surfaces are in contact, the second drain in the base is isolated from the housing and the bearing means in the base and bearing seals in the base are isolated from the first drain whereby the bearing means and bearing seal are protected from the fluid medium; and means for displacing the hollow shaft and annular member vertically with respect to the base to open the seal therebetween whereupon the static seals do not ware when the hollow shaft, annular member and filter packet are rotated to remove solid particles from the horizontally extending surfaces by centrifugal force.

2. Ths apparatus of claim 1 further including a backwash channel in the base between the hollow shaft and second drain, said backwash channel having an upwardly facing static seal disposed between the backwash channel and second drain, the apparatus further including a downwardly facing static sealing surface on the hollow shaft aligned with the upwardly facing static seal between the backwash channel and second drain for sealing the backwash channel from the annular space and second drain when the static seals are abutting.

3. The apparatus of claim 2 further including spring means disposed between the hollow shaft and base for urging the hollow shaft upwardly to open the static seals when the hollow shaft is rotated and means for holding the hollow shaft down against the bias of the spring means to close the static seals when the apparatus is filtering the fluid medium.

4. The apparatus of claim 1, 2 or 3 including means for urging at least one of the static sealing surfaces vertically whereby vertically disposed seals remain effective regardless of static seal ware or tolerance discrepencies.

* * * * *